(12) United States Patent
Ueda (10) Patent No.: US 10,782,766 B2
(45) Date of Patent: Sep. 22, 2020

(54) CONTROL APPARATUS

(71) Applicant: OMRON Corporation, Kyoto (JP)

(72) Inventor: Hiroaki Ueda, Otsu (JP)

(73) Assignee: OMRON Corporation, Kyoto (JP)

( * ) Notice: Subject to any disclaimer, the term of this patent is extended or adjusted under 35 U.S.C. 154(b) by 76 days.

(21) Appl. No.: 16/219,977

(22) Filed: Dec. 14, 2018

(65) Prior Publication Data

US 2019/0278356 A1 Sep. 12, 2019

(30) Foreign Application Priority Data

Mar. 12, 2018 (JP) ................................ 2018-044521

(51) Int. Cl.

| G06F 1/32 | (2019.01) |
|---|---|
| G06F 1/3234 | (2019.01) |
| G05F 1/46 | (2006.01) |
| G06F 1/30 | (2006.01) |
| G06F 1/26 | (2006.01) |
| G06F 1/28 | (2006.01) |
| H02J 1/10 | (2006.01) |

(52) U.S. Cl.
CPC ............ *G06F 1/3234* (2013.01); *G05F 1/465* (2013.01); *G06F 1/263* (2013.01); *G06F 1/28* (2013.01); *G06F 1/305* (2013.01); *H02J 1/10* (2013.01); *H02J 1/108* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 4,638,175 A | 1/1987 | Bradford et al. |
|---|---|---|
| 7,120,812 B2 * | 10/2006 | Teradaira ................. B41J 2/175 |
| | | 713/340 |
| 8,924,761 B2 * | 12/2014 | Baba ....................... G06F 1/266 |
| | | 713/330 |
| 2012/0044231 A1 | 2/2012 | Park |

(Continued)

FOREIGN PATENT DOCUMENTS

JP 2009223418 10/2009

OTHER PUBLICATIONS

"Search Report of Europe Counterpart Application", dated Jul. 9, 2019, p. 1-p. 9.

*Primary Examiner* — Zahid Choudhury
(74) *Attorney, Agent, or Firm* — JCIPRNET (57) ABSTRACT

There is expected a technique capable of, in the case where supply of power to a control apparatus is cut off, performing appropriate processing on other units. The control apparatus receives supply of power from an external power supply to a power supply unit and supplies power to a main arithmetic unit and a secondary arithmetic unit. The power supply unit is configured to, when receiving a detection signal indicating that a voltage of power supplied to a plurality of arithmetic units falls below a predetermined threshold value, send a shutdown command onto a local bus via a bus master part, and also send the shutdown command to the secondary arithmetic unit.

8 Claims, 3 Drawing Sheets

(56) References Cited

U.S. PATENT DOCUMENTS

2013/0110313 A1\* 5/2013 Rupf ................... H04L 5/1415
                                                    701/1
2015/0121104 A1\* 4/2015 Kinouchi ............. G06F 1/3287
                                                    713/322

\* cited by examiner

CONTROL APPARATUS

CROSS-REFERENCE TO RELATED APPLICATION

This application claims the priority benefit of Japan Application No. 2018-044521, filed on Mar. 12, 2018. The entirety of the above-mentioned patent application is hereby incorporated by reference herein and made a part of this specification.

BACKGROUND

Technical Field

The disclosure relates to a technique in the case where supply of power to a control apparatus is cut off.

Related Art

In a factory automation (FA) system, a control apparatus that controls an input-output device in production equipment includes one or a plurality of arithmetic units, wherein the arithmetic unit and the device whose operation is controlled by the arithmetic unit are connected to a network. In this way, the arithmetic unit and the input-output device cyclically communicate via the network, and transmit and receive communication data to control the production equipment.

For example, Japanese Laid-open No. 2009-223418 discloses the following content. In an industrial controller having two duplicate CPU units, an active-side arithmetic unit to which a communication cable with a control program development apparatus (tool apparatus) is connected determines whether or not a command frame transmitted from the tool apparatus is addressed to the active-side arithmetic unit itself. In the case where the command frame is addressed to the active-side arithmetic unit itself, the active-side arithmetic unit transmits a response frame to the tool apparatus. In the case where the command frame is not addressed to the active-side arithmetic unit itself, the active-side arithmetic unit transfers the command frame to a standby-side arithmetic unit to which the communication cable with the tool apparatus is not connected. The standby-side arithmetic unit creates a response frame including an execution result based on the transmitted response frame, and transmits the response frame to the active-side arithmetic unit.

SUMMARY

When supply of power from an external power supply to the control apparatus is cut off, processing in the case where the supply of power is cut off is also required on other units connected to the arithmetic unit.

The disclosure provides a new configuration in the case where the supply of power to the control apparatus is cut off.

In an example of the disclosure, a control apparatus includes: a main arithmetic unit, executing a first control operation; a secondary arithmetic unit, executing a second control operation; and a power supply unit, receiving power from outside and supplying power to the main arithmetic unit and the secondary arithmetic unit. The main arithmetic unit includes: an arithmetic processing part, including a processor; a bus master part, connected to the arithmetic processing part and managing data transmission on a local bus; and a power supply circuit, receiving the power from the power supply unit and supplying power to the arithmetic processing part and the bus master part. The power supply unit includes an output circuit which, when a voltage of the power supplied to the main arithmetic unit and the secondary arithmetic unit falls below a predetermined threshold value, outputs a detection signal indicating a voltage drop to the main arithmetic unit. When receiving the detection signal from the power supply unit, the main arithmetic unit sends a shutdown command onto the local bus via the bus master part, and also sends the shutdown command to the secondary arithmetic unit.

DESCRIPTION OF THE EMBODIMENTS

According to the disclosure, the control apparatus is capable of reliably executing processing in the case where the supply of power is cut off not only on an arithmetic unit but also on other units connected to the arithmetic unit.

In an example of the disclosure, the power supply unit includes, between a port receiving the power from the outside and a voltage conversion part, a circuit storing power.

According to the disclosure, the control apparatus is capable of executing smoothing processing on the power supplied to the arithmetic unit.

In an example of the disclosure, the power supply circuit includes: a first port, receiving the power from the power supply unit; a second port, receiving power from a power supply apparatus different from the power supply unit; and a backup circuit, connected to both the first port and the second port.

According to the disclosure, even if power is supplied from any one of a plurality of ports, the control apparatus can easily secure power of a backup power supply.

In an example of the disclosure, the power supply circuit further includes a blocking circuit for preventing a current from flowing between the first port and the second port.

According to the disclosure, even if power is supplied from any one of a plurality of ports, the control apparatus is capable of preventing a current from flowing back to the other ports.

In an example of the disclosure, the power supply circuit includes a first voltage conversion circuit for conversion to a first voltage lower than a voltage appearing at a connection node between the first port and the second port.

According to the disclosure, the control apparatus is capable of generating voltages of different values according to driving voltages of each apparatus.

In an example of the disclosure, the backup circuit further includes: a third voltage conversion circuit, arranged between the first port and the second port and the first voltage conversion circuit, and converting power supplied from a second voltage conversion circuit for conversion to a second voltage higher than the first voltage into a third voltage lower than the second voltage; and a capacitor, connected between the second voltage conversion circuit and the third voltage conversion circuit and capable of storing at least a part of the power output from the second voltage conversion circuit.

According to the disclosure, by a voltage obtained by converting a voltage corresponding to a residual electric charge of the capacitor by a voltage conversion circuit, the control apparatus is capable of ensuring the drive time of a plurality of units for a certain period of time.

In an example of the disclosure, the main arithmetic unit further includes a detection circuit detecting existence of the secondary arithmetic unit and the power supply unit.

According to the disclosure, the control apparatus is capable of reliably detecting a connection state between the main arithmetic unit and the secondary arithmetic unit and between the main arithmetic unit and the power supply unit, and capable of more accurately detecting a power supply state.

The processing in the case where the supply of power is cut off can be reliably executed not only on the arithmetic unit but also on the other units connected to the arithmetic unit.

Embodiments in accordance with the disclosure are hereinafter explained with reference to the drawings. In the following explanation, the same parts and components are denoted by the same reference numerals, and they also have the same names and functions. Accordingly, detailed explanation thereof will not be repeated.

A. Configuration of FA System

Figure 1:
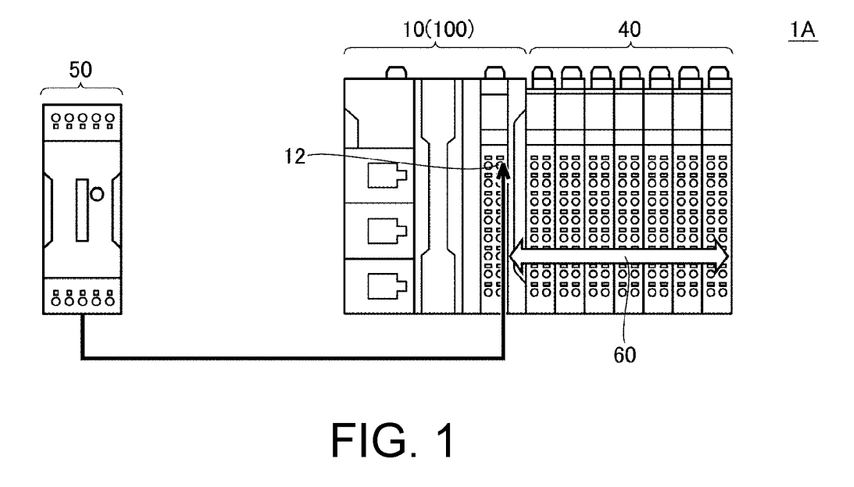
FIG. 1 shows a first configuration example of an FA system in accordance with the present embodiment.
Figure 2:
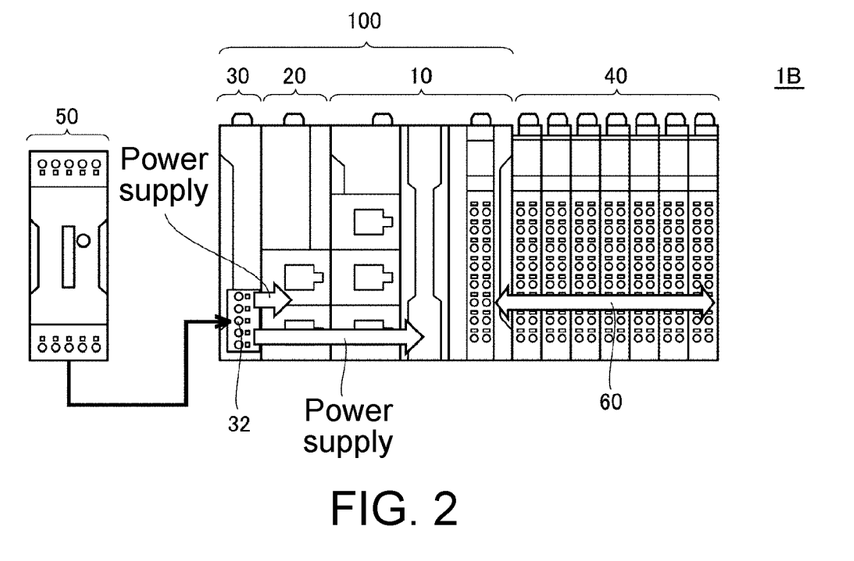
FIG. 2 shows a second configuration example of the FA system in accordance with the present embodiment.

A control system (FA system) of the disclosure is explained with reference to FIG. 1 and FIG. 2. FIG. 1 and FIG. 2 show two configuration examples (1A and 1B) of the FA system in accordance with the present embodiment.

The FA systems 1A and 1B are control systems for controlling a control object such as equipment and an apparatus and automating a production process.

FIG. 1 illustrates a first configuration example of the FA system in accordance with the present embodiment. The FA system 1A being the first configuration example of the FA system includes a main arithmetic unit 10, one or a plurality of functional units 40, and an external power supply 50. The main arithmetic unit 10 is an element constituting the FA system and is equivalent to an arithmetic apparatus controlling processing of the entire FA system. In cases like this where the arithmetic unit of the FA system only includes the main arithmetic unit 10 and does not include other arithmetic units or the like, the main arithmetic unit 10 constitutes a control apparatus 100. The main arithmetic unit 10 exchanges signals relating to setting information or stop of supply of power with the functional unit 40 via a local bus 60. The setting information includes, for example, parameter values in the case where a driving apparatus (e.g., an image sensor) (not shown) connected to the functional unit 40 executes processing (e.g., photographing processing) on a workpiece.

In this way, the functional unit 40 has a function (data collection function) of collecting field information from a machine or equipment or the like being the control object, and/or a function (data output function) of outputting a command signal to the machine or equipment or the like being the control object, and the like.

Specifically, the functional unit 40 is an I/O (Input/Output) unit. Examples of the I/O unit 40 include a digital input (DI) unit, a digital output (DO) unit, an analog input (AI) unit, an analog output (AO) unit, a pulse catch input unit, and a composite unit obtained by mixing a plurality of types of units, and the like.

The external power supply 50 is connected to a second port 12 of the main arithmetic unit 10 and supplies power to the main arithmetic unit 10. A voltage of 24 V, for example, is applied to the second port 12. In cases like this where the main arithmetic unit 10 is not connected to other arithmetic units such as a power supply unit, it is possible for the main arithmetic unit 10 to receive supply of power directly from the second port 12 provided in the main arithmetic unit 10 itself.

FIG. 2 shows a second configuration example of the FA system in accordance with the present embodiment. The FA system 1B being the second configuration example of the FA system is obtained by further adding a new configuration to the configuration of the above-described FA system 1A. Specifically, the FA system 1B includes, in addition to the main arithmetic unit 10, the I/O unit 40 and the external power supply 50, a secondary arithmetic unit 20 and a power supply unit 30.

The secondary arithmetic unit 20 is a unit electrically connected to the main arithmetic unit 10, executing one processing in cooperation with the main arithmetic unit 10 or executing processing different from that executed by the main arithmetic unit 10, and is a unit for improving throughput or processing speed of the entire FA system. In this way, the secondary arithmetic unit 20 functions as an auxiliary unit supporting the processing of the main arithmetic unit 10.

The power supply unit 30 is a unit having a power port 32, receiving supply of power from the external power supply 50 to the power port 32 and supplying power to the main arithmetic unit 10 and the secondary arithmetic unit 20. Specifically, after the power from the external power supply 50 is supplied to the power supply unit 30, the main arithmetic unit 10 receives supply of power to a first port 11 in FIG. 3 which is to be described later. A voltage of 12 V, for example, is applied to the first port 11. In cases like this where the main arithmetic unit 10 is connected to other arithmetic units such as the power supply unit 30, it is possible for the main arithmetic unit 10 to receive supply of power indirectly from the first port 11 provided in the main arithmetic unit 10 itself.

In cases like this where the arithmetic unit of the FA system includes the main arithmetic unit 10, the secondary arithmetic unit 20, and the power supply unit 30 that supplies power to these arithmetic units, the main arithmetic unit 10, the secondary arithmetic unit 20 and the power supply unit 30 constitute the control apparatus 100. Hence, as a power supply receiving pattern of the control apparatus 100 at least including the main arithmetic unit 10, there are two power supplying patterns, i.e., the case of indirectly receiving supply of power from the first port 11 and the case of directly receiving supply of power from the second port 12.

In the following, firstly, a circuit configuration and circuit operation of the main arithmetic unit 10 are explained with reference to FIG. 3.

B. Circuit Configuration and Operation of Main Arithmetic Unit 10

Figure 3:
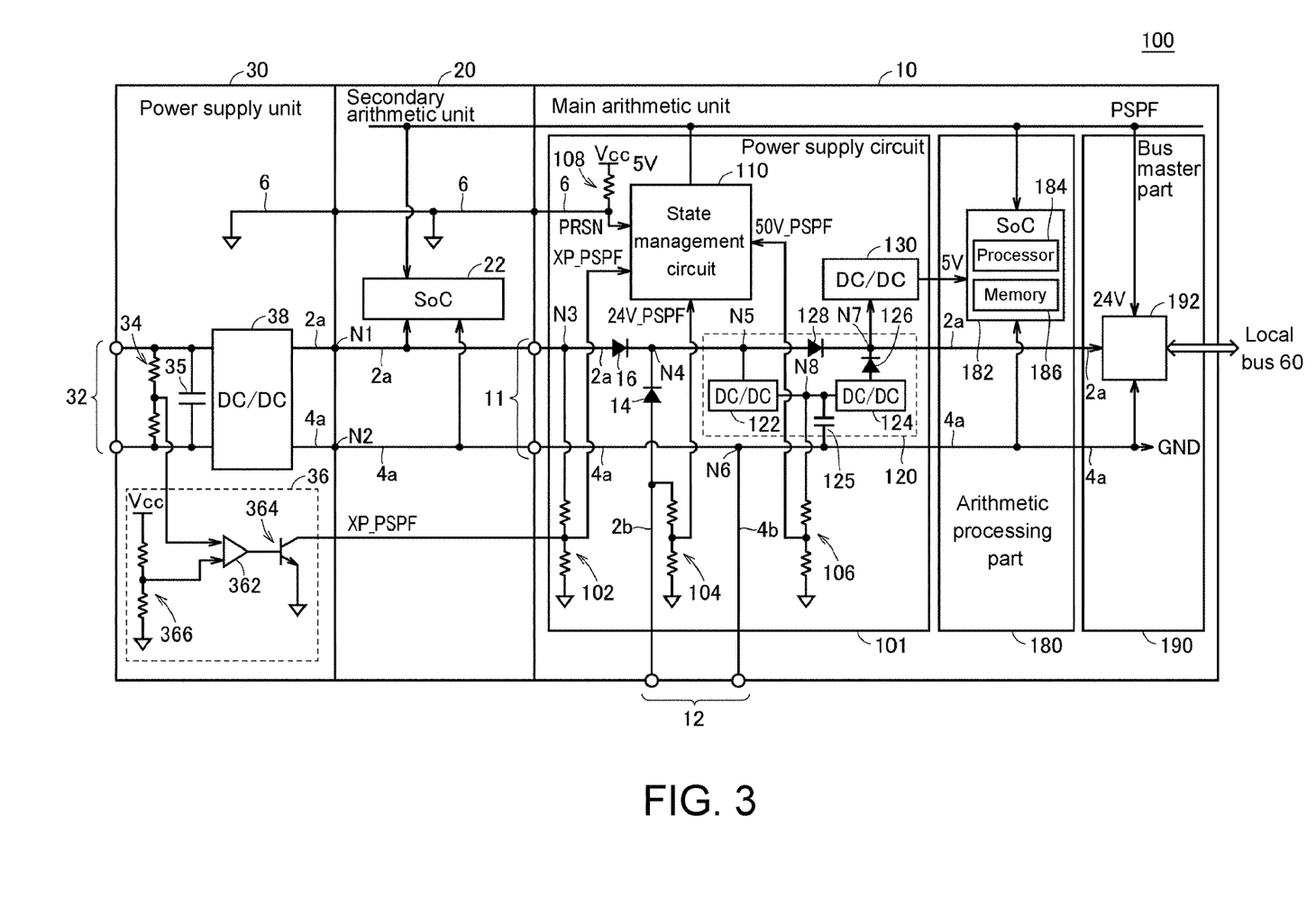
FIG. 3 illustrates a circuit configuration of a control apparatus 100 including a main arithmetic unit 10, a secondary arithmetic unit 20 and a power supply unit 30, in accordance with the present embodiment.

FIG. 3 illustrates a circuit configuration of the control apparatus 100 including the main arithmetic unit 10, the secondary arithmetic unit 20 and the power supply unit 30, in accordance with the present embodiment.

The main arithmetic unit 10 in FIG. 3 is a unit constituting a part of the control apparatus 100, including a power supply circuit 101, an arithmetic processing part 180 and a bus master part 190.

The arithmetic processing part 180 executes various processing in the main arithmetic unit 10. The arithmetic processing part 180 includes a system on a chip (SoC) 182 which at least has a processor 184 and a memory 186. The SoC 182 is a semiconductor chip in which the processor 184, the memory 186 and the like are integrated.

The processor 184 executes various processing in the main arithmetic unit 10 by developing and executing programs recorded in the memory 186. Moreover, the SoC 182 is driven based on a voltage (e.g., 5 V) obtained by dropping down a voltage (e.g., 12 V) based on a potential difference between a potential of a first power line 2a and a potential GND of a first ground line 4a by a first voltage conversion circuit 130 of the power supply circuit 101. Specifically, the first voltage conversion circuit 130 is a DC/DC converter.

A voltage (e.g., 5 V) converted and output by the first voltage conversion circuit 130 is a voltage supplied from the first port 11 and is a voltage lower than a voltage (12 V) which becomes a potential difference between a potential of a node (connection node) N4 and a potential of a node N6. Also, the voltage (e.g., 5 V) converted and output by the first voltage conversion circuit 130 is a voltage supplied from the second port 12 and is a voltage lower than a voltage (24 V) which becomes a potential difference between the potential of the node N4 and the potential of the node N6. In this way, the first voltage conversion circuit 130 of the power supply circuit 101 is capable of performing conversion to a voltage (e.g., 5 V) lower than a voltage (e.g., 12 V or 24 V) appearing between the nodes N4 and N6 between the first port 11 and the second port 12. Accordingly, the control apparatus 100 is capable of generating voltages of different values according to driving voltages of each apparatus.

The bus master part 190 manages data transmission on an internal bus that exchanges communication data with the functional unit 40. The bus master part 190 includes a communication circuit 192.

The communication circuit 192 manages data transmission on a field network that exchanges the communication data with the functional unit 40. As such the field network, fixed-cycle networks such as EtherCAT (registered trademark), EtherNet/IP (registered trademark), DeviceNet (registered trademark), CompoNet (registered trademark) and so on may be used. The communication circuit 192 exchanges the communication data with the functional unit 40 by the local bus 60.

The power supply circuit 101 has the second port 12 receiving supply of power from a power supply apparatus different from the power supply unit 30. A voltage (e.g., 24 V) being a potential difference between a potential of a second power line 2b and a potential of a second ground line 4b, wherein the second power line 2b and the second ground line 4b are connected to the second port 12, is applied to a first voltage divider 104.

The first voltage divider 104 inputs, to a state management circuit 110 via a signal line 24V_PSPF, a voltage (e.g., 12 V) obtained by resistance-dividing the applied voltage. One end of the first voltage divider 104 is grounded.

The state management circuit 110 is a circuit managing a power supply state with respect to the main arithmetic unit 10. When the voltage input from the first voltage divider 104 falls below a predetermined threshold value, the state management circuit 110 determines that the supply of power is not performed. Based on the determination result, the state management circuit 110 sends a shutdown command to the bus master part 190 via a signal line PSPF. The threshold value may be held within the state management circuit 110 or may be held in the memory 186 of the arithmetic processing part 180.

The communication circuit 192 of the bus master part 190 exchanges communication data including information relating to cutoff of power supply with the functional unit 40 via the local bus 60. Specifically, the functional unit 40 receives the information relating to cutoff of power supply from the bus master part 190, and prepares for the cutoff of power supply by executing processing with higher priority before the other processing. The functional unit 40 is powered off after the power supply is cut off.

In this way, the control apparatus 100 is capable of detecting whether or not cutoff of the supply of power is occurring, and capable of notifying the functional unit 40 of a command according to the occurrence or non-occurrence of the cutoff of the supply of power to the main arithmetic unit 10. In addition, the control apparatus 100 itself is also capable of reliably executing saving of data and so on when the supply of power is cut off.

In the case where power is supplied from the second port 12, a current flowing through the second power line 2b flows to the node N4 via a diode 14 and then flows into the first voltage conversion circuit 130 via a diode 128, and a current also flows into the communication circuit 192 of the bus master part 190. In this way, in the control apparatus 100, the SoC 182 of the arithmetic processing part 180 and the communication circuit 192 of the bus master part 190 can be driven.

In addition, in the case where power is supplied from the second port 12 as described above, a current flows in a forward direction (anode→cathode) of the diode 14 of the second power line 2b, but the flowing current does not flow in a backward direction (cathode→anode) of a diode 16 at the node N4. In addition, in the later-described case where power is supplied from the first port 11, a current flows in the forward direction of the diode 16, but does not flow in the backward direction of the diode 14. In this way, by providing a blocking circuit that prevents a current from flowing between the first port 11 and the second port 12, even if power is supplied from any one of a plurality of ports, the control apparatus 100 is capable of preventing a current from flowing back to the other ports.

In addition, a current also flows in the forward direction in the diode 128 at a subsequent stage, but the flowing current does not flow in the backward direction of a diode 126 at a node N7.

Next, a circuit configuration and circuit operation of a backup circuit 120 arranged both between the first port 11 and the second port 12 and the first voltage conversion circuit 130 are explained. Specifically, the backup circuit 120 includes: the diode 128 provided between a node N5 and the node N7 and having its forward direction from the node N5 to the node N7; and a second voltage conversion circuit 122 boosting (e.g., to 50 V) a voltage (e.g., 12 V) of the node N5. In addition, the backup circuit 120 includes: a capacitor 125 charged with electric charge output from the second voltage conversion circuit 122; a third voltage conversion circuit 124 dropping down (e.g., to 14 V) a voltage (e.g., 50 V) corresponding to the electric charge after charging; and the diode 126 provided between the third voltage conversion circuit 124 and the node N7 and having its forward direction from the third voltage conversion circuit 124 to the node N7.

In the case where predetermined electric charge is charged into the capacitor 125, even if the supply of power is cut off from both the first port 11 and the second port 12, by a predetermined voltage corresponding to the electric charge of the capacitor 125, a current can be supplied to the first voltage conversion circuit 130. In this way, even if the supply of power to the main arithmetic unit 10 is cut off, in the control apparatus 100, by operating a circuit including the capacitor 125 as a backup circuit, short-time operation of the arithmetic processing part 180 or the like is enabled by residual electric charge in the capacitor 125.

Specifically, the control apparatus 100 converts the voltage (50 V) corresponding to the residual electric charge of the capacitor 125 into a voltage (5 V) converted by the first voltage conversion circuit 130 or a voltage (14 V) converted by the third voltage conversion circuit 124, a certain time for driving a plurality of units including the SoC 182 of the arithmetic processing part 180 of the main arithmetic unit 10 and the functional unit 40 can be ensured. These units are capable of reliably executing processing including saving of data and so on in the case where the supply of power is cut off during the certain time.

A second voltage divider 106 is provided at a node N8 between the second voltage conversion circuit 122 and the capacitor 125. The second voltage divider 106 inputs, to the state management circuit 110 via a signal line 50V_PSPF, a voltage (e.g., 25 V) obtained by resistance-dividing the voltage (e.g., 50 V) corresponding to the electric charge charged into the capacitor 125. One end of the second voltage divider 106 is grounded.

When the voltage input from the second voltage divider 106 falls below a predetermined threshold value, the state management circuit 110 determines that a charge voltage of the backup circuit 120 is insufficient. Based on the determination result, the state management circuit 110 sends the shutdown command to the bus master part 190 via the signal line PSPF. The threshold value may be held within the state management circuit 110 or may be held in the memory 186 of the arithmetic processing part 180.

The communication circuit 192 of the bus master part 190 exchanges communication data including information relating to cutoff of power supply with the functional unit 40 via the local bus 60. Specifically, the functional unit 40 receives the information relating to cutoff of power supply from the bus master part 190, and prepares for the cutoff of power supply by executing processing with higher priority before the other processing. The functional unit 40 is powered off after the power supply is cut off.

In this way, the control apparatus 100 is capable of detecting whether or not backup power of the main arithmetic unit 10 is insufficient, and capable of notifying the functional unit 40 of a command according to the state of the backup power.

The power of both ports, i.e., the power received by the second port 12 and the power received by the first port 11, can be supplied to the node N5 provided with the backup circuit 120. In this way, the backup circuit 120 is a circuit connected to both the first port 11 and the second port 12. Hence, in the control apparatus 100, even if power is supplied from any one of a plurality of ports, electric charge can be charged into the capacitor 125 and power of a backup power supply can be easily secured.

C. Circuit Configuration and Operation of Secondary Arithmetic Unit 20

A voltage output from a voltage conversion part 38 of the power supply unit 30 is applied to the secondary arithmetic unit 20. Specifically, a voltage (e.g., 12 V) being an output voltage from the voltage conversion part 38 (being a DC/DC converter) and being a potential difference between a potential of a node N1 and a potential of a node N2 is applied to an SoC 22 of the secondary arithmetic unit 20, and the SoC 22 is driven based on the voltage. Like the SoC 182 of the arithmetic processing part 180, the SoC 22 is a semiconductor chip in which a processor, a memory and the like are integrated. The SoC 22 is driven based on the voltage (e.g., 12 V) based on the potential difference between the potential of the first power line 2a and the potential GND of the first ground line 4a, which is the power supplied from the power supply unit 30.

The secondary arithmetic unit 20 is a unit for improving the throughput or processing speed of the entire FA system by executing processing in cooperation with the main arithmetic unit 10 or executing processing separately from the main arithmetic unit 10. In this way, the secondary arithmetic unit 20 is a unit functioning as a support unit of the main arithmetic unit 10 and constituting a part of the control apparatus 100.

D. Circuit Configuration and Operation of Power Supply Unit 30

The power supply unit 30 is a unit supplying power to the main arithmetic unit 10 and the secondary arithmetic unit 20, and is a unit constituting a part of the control apparatus 100.

The power supply unit 30 includes the power port 32, a third voltage divider 34, a capacitor 35, an output circuit 36, and the voltage conversion part 38. The power port 32 is a port receiving supply of power from the external power supply 50, and a voltage from the external power supply 50 is applied to the power port 32. Specifically, a voltage which is the potential difference between the potential of the power line connected to the power port 32 and the potential of the ground line connected to the power port 32 is applied to the third voltage divider 34, the capacitor 35 provided at a subsequent stage to the third voltage divider 34, and the voltage conversion part 38.

The capacitor 35 is a circuit storing electric charge, and smoothes a current so that ripples are suppressed and the current becomes closer to direct current. By such a function of the capacitor 35, the control apparatus 100 is capable of executing smoothing processing on the power supplied to the arithmetic unit including the main arithmetic unit 10 and the secondary arithmetic unit 20.

The voltage conversion part 38 is a DC/DC converter, dropping down the input voltage (e.g., 24 V) to a predetermined voltage (e.g., 12 V) and outputting it to the secondary arithmetic unit 20. Hence, the potential difference between the potential of the node N1 on the first power line 2a and the potential of the node N2 on the second ground line 4b becomes 12 V, and this voltage is applied to the SoC 22 of the secondary arithmetic unit 20 or the first port 11 of the main arithmetic unit 10.

The third voltage divider 34 is used as a voltage detection part detecting the voltage (e.g., 24 V) input to the power port 32 from the external power supply 50. The output voltage of the third voltage divider 34 is input to a comparator 362 of the output circuit 36.

In this way, the power supply unit 30 is capable of supplying stable power to a plurality of arithmetic units, i.e., the secondary arithmetic unit 20 and the main arithmetic unit 10.

Next, the output circuit 36 is explained. The output circuit 36 includes the comparator 362, a transistor 364 and a reference generation circuit 366. The output circuit 36 compares a voltage input to one input terminal of the comparator 362 with a reference value input to the other input terminal. The control voltage Vcc (e.g., 5 V) is input to the reference generation circuit 366, and a voltage (e.g., 2.5 V) obtained by resistance-dividing the control voltage Vcc is input, as a reference voltage, to the other input terminal of the comparator 362. One end of the reference generation circuit 366 is grounded.

In the case where the input voltage from the third voltage divider 34 is equal to or higher than the reference voltage, a Low signal is output from an output terminal of the comparator 362. The signal output from the output terminal is output to a base of the transistor 364. In this way, that the input voltage becomes equal to or higher than the reference voltage means that the voltage (e.g., 24 V) from the external power supply 50 is applied to the power port 32.

Although the transistor 364 is explained as an NPN transistor as an example, the transistor 364 may be a PNP transistor or a MOSFET (Metal Oxide Semiconductor Field Effect Transistor) as long as the present embodiment can be realized.

A voltage divided by a fourth voltage divider 102 is applied to a collector of the transistor 364. In the case where the Low signal is output from the comparator 362, the transistor 364 is not turned on and no current flows between the collector and a grounded emitter.

In this way, in the case where a voltage of 12 V, for example, is applied to the node N3, and the voltage divided by the fourth voltage divider 102 becomes, for example, 5 V, the output circuit 36 sends such the voltage as a detection signal to the state management circuit 110 via a signal line XP_PSPF. The state management circuit 110 determines that power is being supplied based on the received detection signal.

In contrast, in the case where the input voltage from the third voltage divider 34 to the comparator 362 becomes lower than the reference voltage, a High signal is sent from the comparator 362 to the base of the transistor 364, and the transistor 364 is turned on. In this way, that the input voltage becomes lower than the reference voltage means that the voltage (e.g., 24 V) from the external power supply 50 is not applied to the power port 32. That means the supply of power from the external power supply 50 is cut off.

By turning on the transistor 364, the voltage (e.g., 5 V) of the fourth voltage divider 102 drops to the same potential (0 V) as the ground connected to the emitter. The output circuit 36 outputs such the voltage value as the detection signal to the state management circuit 110 via the signal line XP_PSPF. The state management circuit 110 determines that the supply of power from the external power supply 50 is cut off based on the received detection signal.

When receiving the detection signal indicating a voltage drop from the signal line XP_PSPF, the state management circuit 110 sends the shutdown command to the secondary arithmetic unit 20 and the bus master part 190 of the main arithmetic unit 10 via the signal line PSPF. Specifically, when receiving a detection signal of 0 V via the signal line XP_PSPF, the state management circuit 110 switches a signal to be transmitted to the bus master part 190 and the secondary arithmetic unit 20 via the signal line PSPF from High to Low. This signal is in the High state in the case where the voltage divided by the fourth voltage divider 102 via the signal line XP_PSPF to the state management circuit 110 is equal to or higher than a predetermined voltage (e.g., 5 V). In the case where it is detected that the voltage divided by the fourth voltage divider 102 is lower than the predetermined voltage, this signal is switched from the High state to the Low state. The bus master part 190 and the secondary arithmetic unit 20, in which a Low signal obtained by such switching from the High state to the Low state is detected, execute preparation for shutdown.

Accordingly, the control apparatus 100 is capable of reliably executing the processing in the case where the supply of power is cut off not only on the arithmetic unit but also on other units connected to the arithmetic unit. Specifically, the control apparatus 100 is capable of notifying information relating to power cutoff, which is detected by the main arithmetic unit 10, from the bus master part 190 to the functional unit 40 on the local bus 60 and the secondary arithmetic unit 20. In addition, the functional unit 40 and the secondary arithmetic unit 20 are capable of reliably executing processing including saving of data onto a memory, or invalidation of access to an SD card and so on in the case where the supply of power is cut off. In addition, the arithmetic processing part 180 is also capable of reliably executing the processing including saving of data and so on.

A voltage (e.g., 12 V) applied to the node N1 from the power supply unit 30 and driving the SoC 22 is applied to the first port 11 of the main arithmetic unit 10. Hence, in the case where power is supplied from the external power supply 50 to the power port 32, the voltage of the node N3 at a subsequent stage to the first port 11 becomes 12 V. The fourth voltage divider 102 inputs, to the state management circuit 110 via the signal line XP_PSPF, a voltage (e.g., 5 V) obtained by resistance-dividing the voltage (12 V). One end of the fourth voltage divider 102 is grounded.

The state management circuit 110 detects, in addition to the signal relating to the power supply state as explained above, a signal relating to a connection state between the main arithmetic unit 10 and other units. The state management circuit 110 detects the signal relating to the connection state between the main arithmetic unit 10 and other units. Specifically, the state management circuit 110 has a detection resistor 108 being a circuit detecting the connection state between the main arithmetic unit 10 and the power supply unit 30 and the secondary arithmetic unit 20. The state management circuit 110 receives, via a signal line PRSN, a signal obtained by applying a control voltage Vcc (e.g., 5 V) to the detection resistor 108. In the case where the power supply unit 30 and the secondary arithmetic unit 20 are not connected to the main arithmetic unit 10, the voltage of the detection resistor 108 holds the voltage (5 V) of the control voltage Vcc. Hence, the state management circuit 110 receives a signal of the control voltage (e.g., 5 V).

In contrast, in the case where other units are connected (e.g., where the power supply unit 30 exists), the voltage applied to the detection resistor 108 has the same potential as the ground via a connection line 6, and the state management circuit 110 receives a signal having the same potential (e.g., 0 V) as the ground. Hence, in the case where the signal received via the signal line PRSN indicates the control voltage Vcc (e.g., 5 V), the state management circuit 110 detects that no other units are connected (e.g., the power supply unit 30 and the secondary arithmetic unit 20 do not exist). In addition, in the case where the signal received via the signal line PRSN indicates a voltage (0 V) having the same potential as the ground, the state management circuit 110 detects that other units are connected (at least one of the power supply unit 30 and the secondary arithmetic unit 20 exists).

Accordingly, the control apparatus 100 is capable of reliably detecting the connection state (existence or non-existence) between the main arithmetic unit 10 and the secondary arithmetic unit 20 and the power supply unit 30, and capable of more accurately detecting the power supply state.

E. Determination Processing for Cutoff of Power Supply

Figure 4:
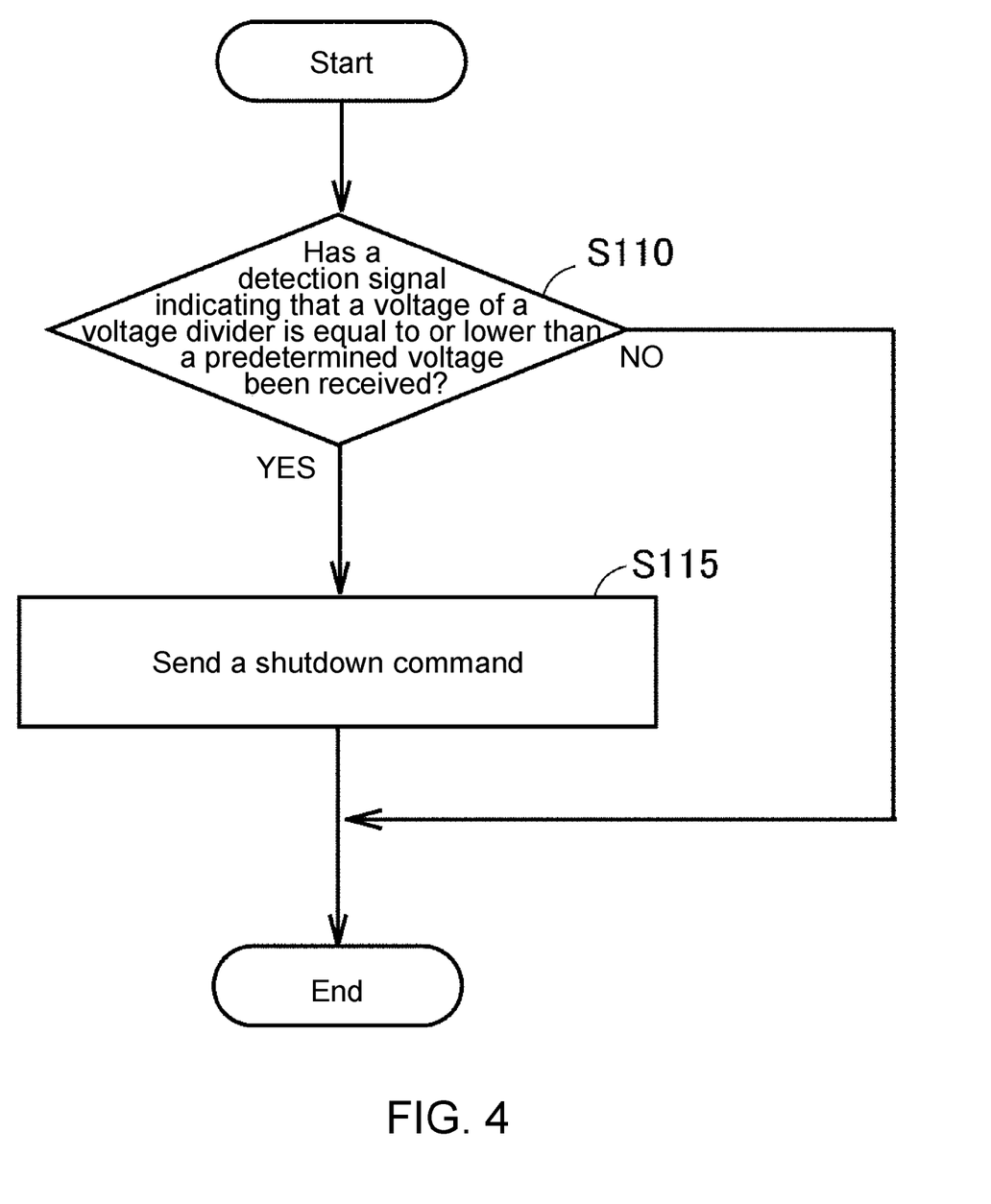
FIG. 4 illustrates detection processing of power supply of a state management circuit 110 in accordance with the present embodiment.

FIG. 4 illustrates detection processing of power supply of the state management circuit 110 in accordance with the present embodiment.

In the processing of step S110, the state management circuit 110 determines whether or not a detection signal indicating that the voltage of the fourth voltage divider 102 is equal to or lower than the predetermined voltage (e.g., 5 V) has been received. In the case where the detection signal has been received (YES in step S110), the state management circuit 110 switches the control to step S115.

In the processing of step S115, the state management circuit 110 sends the shutdown command to the secondary arithmetic unit 20 and the bus master part 190 via the signal line PSPF. Otherwise (NO in step S110), the processing is ended.

Accordingly, the control apparatus 100 is capable of reliably executing the processing including saving of data and so on in the case where the supply of power is cut off not only on the arithmetic processing part 180 within the main arithmetic unit 10 but also on the bus master part 190 within the main arithmetic unit 10 and the functional unit 40 on the local bus 60 as well as the secondary arithmetic unit 20.

F. Modifications

In the present embodiment, it has been explained that the main arithmetic unit 10 sends the shutdown command to two types of units, i.e., the secondary arithmetic unit 20 and the functional unit 40. In contrast, the object to which the main arithmetic unit 10 sends the shutdown command is not limited to the above two types of units but may be the other units.

In the present embodiment, it has been explained that, when receiving the detection signal indicating a voltage drop from the signal line XP_PSPF, the state management circuit 110 sends the shutdown command to the secondary arithmetic unit 20 and the bus master part 190 of the main arithmetic unit 10 via the signal line PSPF. Specifically, it has been explained that, in the case of lower than the predetermined voltage, the state management circuit 110 sends the Low signal by switching the signal from the High state to the Low state. In contrast, the state management circuit 110 may send information relating to shutdown high and low voltages using a signal line that transmits and receives internal commands of the control apparatus 100 including the main arithmetic unit 10.

The shutdown command output by the state management circuit 110 may be sent from the arithmetic processing part 180 to the bus master part 190. That is, the arithmetic processing part 180 may receive the shutdown command from the state management circuit 110 and send the shutdown command to the bus master part 190.

G. Additional Remark

[Configuration 1]
A control apparatus (100) for controlling a control object, including:

a main arithmetic unit (10), executing a first control operation;
a secondary arithmetic unit (20), executing a second control operation; and
a power supply unit (30), receiving power from outside and supplying power to the main arithmetic unit (10) and the secondary arithmetic unit (20),
wherein the main arithmetic unit (10) includes:
an arithmetic processing part (180), including a processor (184);
a bus master part (190), connected to the arithmetic processing part (180) and managing data transmission on a local bus (60); and
a power supply circuit (101), receiving the power from the power supply unit (30) and supplying power to the arithmetic processing part (180) and the bus master part (190), wherein
the power supply unit (30) includes an output circuit (36) which outputs a detection signal indicating a voltage drop to the main arithmetic unit (10) when a voltage of the power supplied to the main arithmetic unit (10) and the secondary arithmetic unit (20) falls below a predetermined threshold value; and
the main arithmetic unit (10) is configured to, when receiving the detection signal from the power supply unit (30), send a shutdown command onto the local bus (60) via the bus master part (190), and also send the shutdown command to the secondary arithmetic unit (20).

[Configuration 2]
The control apparatus described in Configuration 1, wherein the power supply unit (30) includes, between a port (32) receiving the power from the outside and a voltage conversion part (38), a circuit (35) storing power.

[Configuration 3]
The control apparatus described in Configuration 1 or 2, wherein the power supply circuit (101) includes:
a first port (11), receiving the power from the power supply unit (30);
a second port (12), receiving power from a power supply apparatus different from the power supply unit (30); and
a backup circuit (120), connected to both the first port (11) and the second port (12).

[Configuration 4]
The control apparatus described in Configuration 3, wherein the power supply circuit (101) further includes a blocking circuit for preventing a current from flowing between the first port (11) and the second port (12).

[Configuration 5]
The control apparatus described in Configuration 3 or 4, wherein the power supply circuit (101) further includes a first voltage conversion circuit (130) for conversion to a first voltage lower than a voltage appearing at a connection node between the first port (11) and the second port (12).

[Configuration 6]
The control apparatus described in Configuration 5, wherein the backup circuit (120) includes:
a third voltage conversion circuit (124), arranged between the first port (11) and the second port (12) and the first voltage conversion circuit (130), and converting power supplied from a second voltage conversion circuit (122) for conversion to a second voltage higher than the first voltage into a third voltage lower than the second voltage; and
a capacitor (125), connected between the second voltage conversion circuit (122) and the third voltage conversion circuit (124) and capable of storing at least a part of the power output from the second voltage conversion circuit (122).

[Configuration 7]

The control apparatus described in any one of Configurations 1 to 6, wherein the main arithmetic unit (10) further includes a detection circuit detecting existence of the secondary arithmetic unit (20) and the power supply unit (30).

The embodiments disclosed herein are examples in all aspects and should not be interpreted as limitations. The scope of the disclosure is defined by claims instead of the above explanation, and it is intended to include all modifications within the scope of the claims and the equivalents thereof.

What is claimed is:

1. A control apparatus for controlling a control object, comprising:
    a main arithmetic unit, executing a first control operation;
    a secondary arithmetic unit, executing a second control operation; and
    a power supply unit, receiving power from outside and supplying power to the main arithmetic unit and the secondary arithmetic unit,
    wherein the main arithmetic unit comprises:
        an arithmetic processing part, comprising a processor;
        a bus master part, connected to the arithmetic processing part and managing data transmission on a local bus; and
        a power supply circuit, receiving the power from the power supply unit and supplying power to the arithmetic processing part and the bus master part,
    wherein the power supply unit comprises an output circuit which outputs a detection signal indicating a voltage drop to the main arithmetic unit when a voltage of the power supplied to the main arithmetic unit and the secondary arithmetic unit falls below a predetermined threshold value; wherein
    the main arithmetic unit is configured to, when receiving the detection signal from the power supply unit, send a shutdown command onto the local bus via the bus master part, and also send the shutdown command to the secondary arithmetic unit; and
    the power supply circuit further comprises:
        a first port, receiving the power from the power supply unit,
        a second port, receiving power from a power supply apparatus different from the power supply unit, and
        a backup circuit, connected to both the first port and the second port;
    wherein the power supply circuit further comprises a first voltage conversion circuit for conversion to a first voltage lower than a voltage appearing at a connection node between the first port and the second port, and
    wherein the backup circuit further comprises:
        a third voltage conversion circuit, arranged between the first port and the second port and the first voltage conversion circuit, and converting power supplied from a second voltage conversion circuit for conversion to a second voltage higher than the first voltage into a third voltage lower than the second voltage; and
        a capacitor, connected between the second voltage conversion circuit and the third voltage conversion circuit and capable of storing at least a part of the power output from the second voltage conversion circuit.

2. The control apparatus according to claim 1, wherein the power supply unit comprises, between a port receiving the power from the outside and a voltage conversion part, a circuit storing power.

3. The control apparatus according to claim 2, wherein the power supply circuit comprises:
    a first port, receiving the power from the power supply unit;
    a second port, receiving power from a power supply apparatus different from the power supply unit; and
    a backup circuit, connected to both the first port and the second port.

4. The control apparatus according to claim 1, wherein the power supply circuit further comprises a blocking circuit for preventing a current from flowing between the first port and the second port.

5. The control apparatus according to claim 4, wherein the power supply circuit further comprises a first voltage conversion circuit for conversion to a first voltage lower than a voltage appearing at a connection node between the first port and the second port.

6. The control apparatus according to claim 1, wherein the main arithmetic unit further comprises a detection circuit detecting existence of the secondary arithmetic unit and the power supply unit.

7. The control apparatus according to claim 2, wherein the main arithmetic unit further comprises a detection circuit detecting existence of the secondary arithmetic unit and the power supply unit.

8. The control apparatus according to claim 4, wherein the main arithmetic unit further comprises a detection circuit detecting existence of the secondary arithmetic unit and the power supply unit.

* * * * *